US011604006B2

(12) United States Patent
Shaffer et al.

(10) Patent No.: US 11,604,006 B2
(45) Date of Patent: Mar. 14, 2023

(54) MAKEUP AIR PARALLEL FLOW ENERGY RECOVERY SYSTEM ATOP AIR CONDITIONER

(71) Applicant: Haier US Appliance Solutions, Inc., Wilmington, DE (US)

(72) Inventors: Timothy Scott Shaffer, La Grange, KY (US); Eric Ormsby Sakal, Louisville, KY (US); Joseph Robert Tobbe, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 134 days.

(21) Appl. No.: 17/322,122

(22) Filed: May 17, 2021

(65) Prior Publication Data

US 2022/0364760 A1    Nov. 17, 2022

(51) Int. Cl.
*F24F 12/00* (2006.01)
*F24F 11/00* (2018.01)

(52) U.S. Cl.
CPC ........ *F24F 12/002* (2013.01); *F24F 11/0001* (2013.01); *F24F 2011/0002* (2013.01); *F24F 2012/005* (2013.01); *Y02B 30/52* (2013.01); *Y02B 30/56* (2013.01)

(58) Field of Classification Search
CPC .. F24F 12/002; F24F 12/003; F24F 2012/005; Y02B 30/52; Y02B 30/56
See application file for complete search history.

(56) References Cited

U.S. PATENT DOCUMENTS

| 5,579,647 | A | * | 12/1996 | Calton | F24F 3/1423 |
| | | | | | 62/223 |
| 6,328,095 | B1 | | 12/2001 | Felber | |
| 10,495,341 | B2 | | 12/2019 | Hashino | |
| 11,320,161 | B2 | * | 5/2022 | Fischer | F24F 5/0046 |
| 2019/0008076 | A1 | * | 1/2019 | Ghadiri Moghaddam | ................. |
| | | | | | H05K 7/20745 |
| 2019/0063780 | A1 | | 2/2019 | Aldrich | |
| 2021/0071881 | A1 | * | 3/2021 | Shaffer | F24F 1/027 |

FOREIGN PATENT DOCUMENTS

| CN | 204202098 U | 3/2015 |
| CN | 204963114 U | 1/2016 |
| CN | 206890750 U | 1/2018 |

* cited by examiner

*Primary Examiner* — Lionel Nouketcha
(74) *Attorney, Agent, or Firm* — Dority & Manning, P.A.

(57) ABSTRACT

An air conditioner unit includes a housing with an outdoor heat exchanger assembly and an indoor heat exchanger assembly therein. A makeup air intake duct an a makeup are exhaust duct are disposed above the housing parallel to each other. The air conditioner unit also includes a heat exchanger having a first coil and a second coil. The first coil is disposed within the makeup air intake duct. The second coil is disposed with the makeup air exhaust duct. The heat exchanger also includes a first pipe connecting an outlet of the first coil to an inlet of the second coil and a second pipe connecting an outlet of the second coil to an inlet of the first coil.

20 Claims, 4 Drawing Sheets

MAKEUP AIR PARALLEL FLOW ENERGY RECOVERY SYSTEM ATOP AIR CONDITIONER

FIELD OF THE INVENTION

The present subject matter relates generally to air conditioning appliances, and more particularly to integrated makeup air assemblies for air conditioning appliances having parallel flow energy recovery systems.

BACKGROUND OF THE INVENTION

Air conditioner units are conventionally utilized to adjust the temperature within structures such as dwellings and office buildings. In particular, one-unit type room air conditioner units, such as single-package vertical units (SPVU), may be utilized to adjust the temperature in, for example, a single room or group of rooms of a structure. A typical one-unit type air conditioner or air conditioning appliance includes an indoor portion and an outdoor portion. The indoor portion generally communicates (e.g., exchanges air) with the area within a building, and the outdoor portion generally communicates (e.g., exchanges air) with the area outside a building. Accordingly, the air conditioner unit generally extends through, for example, an outer wall of the structure. Generally, a fan may be operable to rotate to motivate air through the indoor portion. Another fan may be operable to rotate to motivate air through the outdoor portion. A sealed cooling system including a compressor is generally housed within the air conditioner unit to treat (e.g., cool or heat) air as it is circulated through, for example, the indoor portion of the air conditioner unit. One or more control boards are typically provided to direct the operation of various elements of the particular air conditioner unit.

Makeup air, e.g., additional fresh air from outside of the building, is typically provided with a large separate system remote from the air conditioner. Conventional separate systems can be costly. Further, because conventional separate systems are distant from the air conditioner, there is little opportunity to recover energy from previously treated air exhausted from the building.

As a result, further improvements to air conditioners may be advantageous. In particular, it would be useful to provide a makeup air system integrated with an air conditioner that provides for energy recovery from exhausted air.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an air conditioner unit is provided. The air conditioner unit defines a mutually-perpendicular vertical direction, lateral direction, and transverse direction. The air conditioner unit includes a housing that defines an outdoor portion and an indoor portion. An outdoor heat exchanger assembly is disposed in the outdoor portion. The outdoor heat exchanger assembly includes an outdoor heat exchanger and an outdoor fan. An indoor heat exchanger assembly is disposed in the indoor portion. The indoor heat exchanger assembly includes an indoor heat exchanger and an indoor fan. The air conditioner unit also includes a compressor in fluid communication with the outdoor heat exchanger and the indoor heat exchanger to circulate a refrigerant between the outdoor heat exchanger and the indoor heat exchanger. A makeup air intake duct is disposed above the housing. A makeup air exhaust duct is disposed above the housing and parallel to the makeup air intake duct. The air conditioner unit also includes a heat exchanger. The heat exchanger includes a first coil and a second coil. The first coil includes a first inlet, a first tube, a first plurality of fins formed on an external surface of the first tube, and a first outlet. The first coil is disposed within the makeup air intake duct. The second coil includes a second inlet, a second tube, a second plurality of fins formed on an external surface of the second tube, and a second outlet. The second coil is disposed within the makeup air exhaust duct. The heat exchanger also includes a first pipe connecting the first outlet and the second inlet and a second pipe connecting the second outlet and the first inlet.

In another exemplary aspect of the present disclosure, an air conditioner unit is provided. The air conditioner unit includes a housing that defines an outdoor portion and an indoor portion. An outdoor heat exchanger assembly is disposed in the outdoor portion. The outdoor heat exchanger assembly includes an outdoor heat exchanger and an outdoor fan. An indoor heat exchanger assembly is disposed in the indoor portion. The indoor heat exchanger assembly includes an indoor heat exchanger and an indoor fan. The air conditioner unit also includes a compressor in fluid communication with the outdoor heat exchanger and the indoor heat exchanger to circulate a refrigerant between the outdoor heat exchanger and the indoor heat exchanger. A makeup air intake duct is disposed above the housing. A makeup air exhaust duct is disposed above the housing and parallel to the makeup air intake duct. The air conditioner unit also includes a heat exchanger. The heat exchanger includes a first coil and a second coil. The first coil includes a first inlet, a first tube, a first plurality of fins formed on an external surface of the first tube, and a first outlet. The first coil is disposed within the makeup air intake duct. The second coil includes a second inlet, a second tube, a second plurality of fins formed on an external surface of the second tube, and a second outlet. The second coil is disposed within the makeup air exhaust duct. The heat exchanger also includes a first pipe connecting the first outlet and the second inlet and a second pipe connecting the second outlet and the first inlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
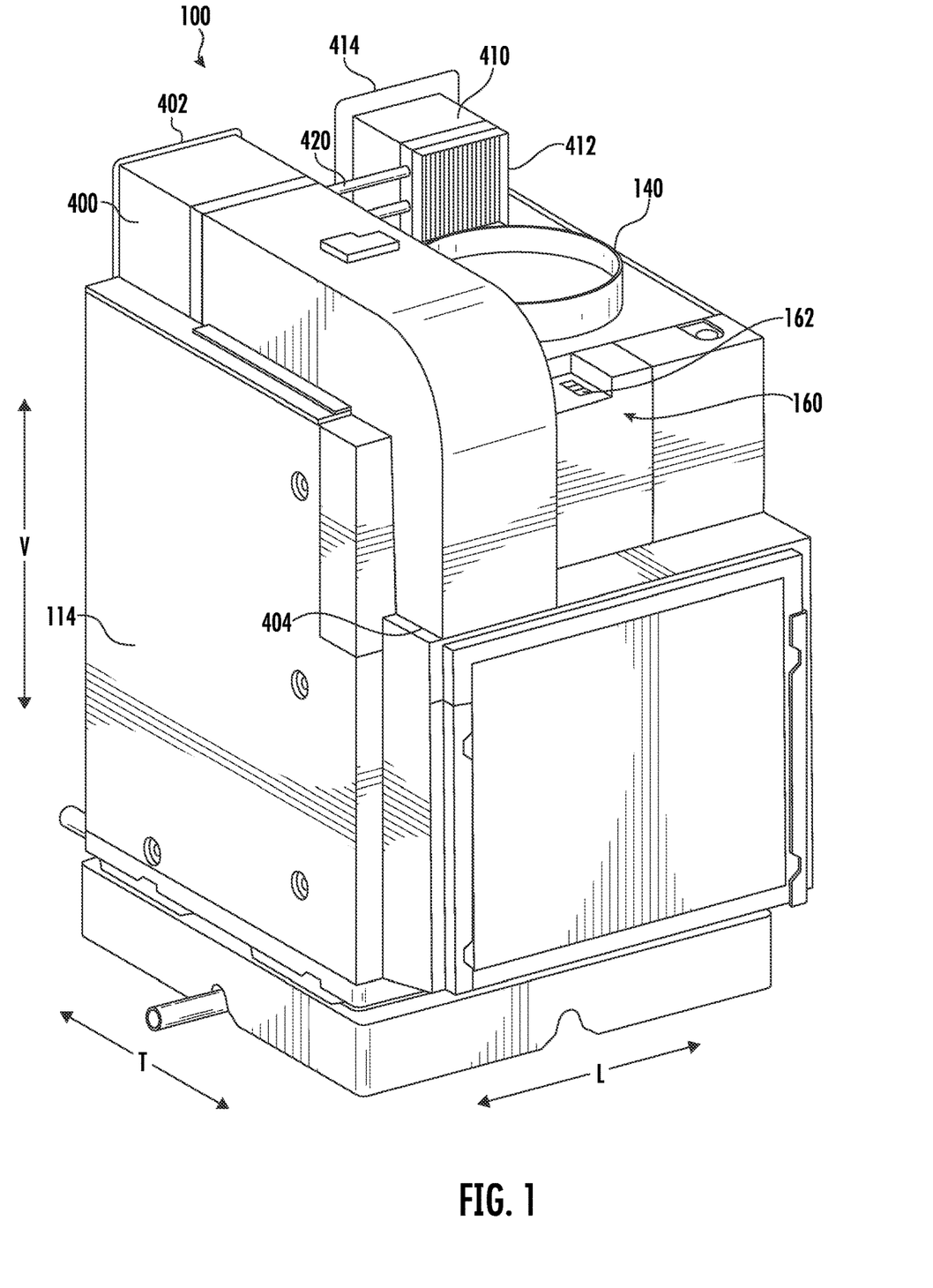
FIG. 1 provides a perspective view of an air conditioner unit according to one or more exemplary embodiments of the present disclosure.
Figure 2:
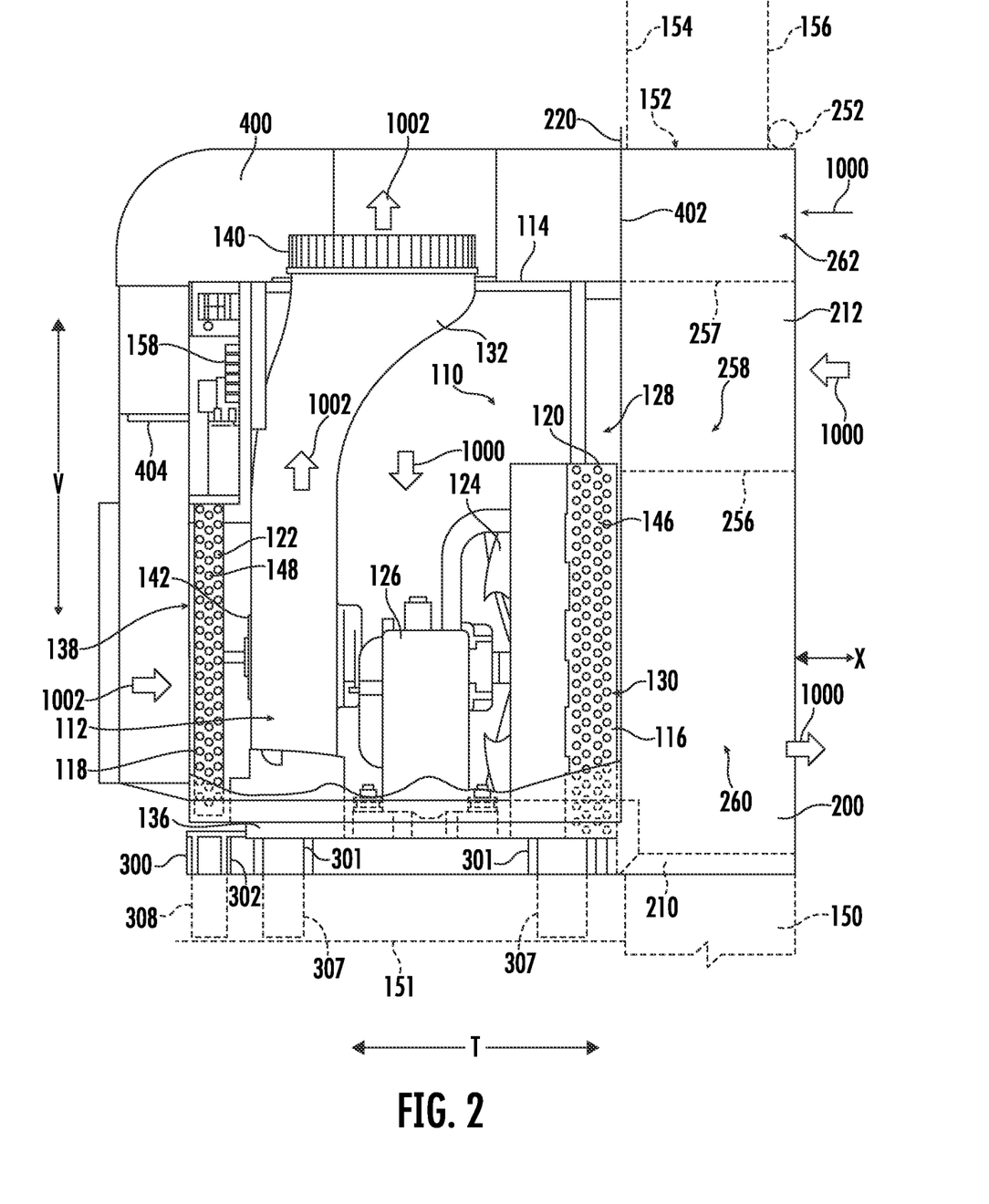
FIG. 2 provides a section view of the air conditioner unit of FIG. 1 according to one or more exemplary embodiments of the present disclosure.

Turning now to the figures, FIGS. 1 and 2 illustrate an exemplary air conditioner appliance or air conditioner unit (e.g., air conditioner 100). As shown, air conditioner 100 may be provided as a one-unit type air conditioner 100, such as a single-package vertical unit. Air conditioner 100 includes a package housing 114 supporting an indoor portion 112 and an outdoor portion 110.

Generally, air conditioner 100 defines a vertical direction V, lateral direction L, and transverse direction T. Each direction V, L, T is mutually perpendicular with every other direction, such that an orthogonal coordinate system is generally defined.

In some embodiments, housing 114 contains various other components of the air conditioner 100. Housing 114 may include, for example, a rear opening 116 (e.g., with or without a grille or grate thereacross) and a front opening 118 (e.g., with or without a grille or grate thereacross) may be spaced apart from each other along the transverse direction T. The rear opening 116 may be part of the outdoor portion 110, while the front opening 118 may be part of the indoor portion 112. Components of the outdoor portion 110, such as an outdoor heat exchanger 120, outdoor fan 124, and compressor 126 may be enclosed within housing 114 between front opening 118 and rear opening 116. In certain embodiments, one or more components are mounted on a base 136, as shown. The base 136 may be received on or within a drain pan 300.

During certain operations, air 1000 may be drawn to outdoor portion 110 through rear opening 116. Specifically, an outdoor inlet 128 defined through housing 114 may receive outdoor air 1000 motivated by outdoor fan 124. Within housing 114, the received outdoor air 1000 may be motivated through or across outdoor fan 124. Moreover, at least a portion of the outdoor air 1000 may be motivated through or across outdoor heat exchanger 120 before exiting the rear opening 116 at an outdoor outlet 130. It is noted that although outdoor inlet 128 is illustrated as being defined above outdoor outlet 130, alternative embodiments may reverse this relative orientation (e.g., such that outdoor inlet 128 is defined below outdoor outlet 130) or provide outdoor inlet 128 beside outdoor outlet 130 in a side-by-side orientation, or another suitable orientation.

As shown, indoor portion 112 may include an indoor heat exchanger 122, and an indoor fan 142, e.g., a blower fan 142 as in the illustrated example embodiment. These components may, for example, be housed behind the front opening 118. A bulkhead may generally support or house various other components or portions thereof of the indoor portion 112, such as the blower fan 142. The bulkhead may generally separate and define the indoor portion 112 and outdoor portion 110 within housing 114.

During certain operations, indoor air 1002 may be drawn to indoor portion 112 through front opening 118. Specifically, an indoor inlet 138 defined through housing 114 may receive indoor air 1002 motivated by blower fan 142. At least a portion of the indoor air 1002 may be motivated through or across indoor heat exchanger 122 before passing to a duct 132. The indoor air 1002 may be motivated (e.g., by fan 142) into and through the duct 132 and returned to the indoor area of the room through an indoor outlet 140 defined through housing 114 (e.g., above indoor inlet 138 along the vertical direction V). Optionally, one or more conduits (not pictured) may be mounted on or downstream from indoor outlet 140 to further guide air 1002 from air conditioner 100. It is noted that although indoor outlet 140 is illustrated as generally directing air upward, it is understood that indoor outlet 140 may be defined in alternative embodiments to direct air in any other suitable direction.

Outdoor and indoor heat exchangers 120, 122 may be components of a thermodynamic assembly (i.e., sealed system), which may be operated as a refrigeration assembly (and thus perform a refrigeration cycle) or, in the case of the heat pump unit embodiment, a heat pump (and thus perform a heat pump cycle). Thus, as is understood, exemplary heat pump unit embodiments may be selectively operated to perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in the cooling mode).

The sealed system may, for example, further include compressor 126 (e.g., mounted on base 136) and an expansion device (e.g., expansion valve or capillary tube—not pictured), both of which may be in fluid communication with the heat exchangers 120, 122 to flow refrigerant therethrough, as is generally understood. The outdoor and indoor heat exchangers 120, 122 may each include coils 146, 148, as illustrated, through which a refrigerant may flow for heat exchange purposes, as is generally understood.

A plenum 200 may be provided to direct air to or from housing 114. When installed, plenum 200 may be selectively attached to (e.g., fixed to or mounted against) housing 114 (e.g., via a suitable mechanical fastener, adhesive, gasket, etc.) and extend through a structure wall 150 (e.g., an outer wall of the structure within which air conditioner 100 is installed) and above a floor 151. In particular, plenum 200 extends along an axial direction X (e.g., parallel to the transverse direction T) through a hole or channel 152 in the structure wall 150 that passes from an internal surface 154 to an external surface 156. Optionally, a caulk bead 252 (i.e., adhesive or sealant caulk) may be provided to join the plenum 200 to the external surface 156 of structure wall 150 (e.g., about or outside from wall channel 152).

The plenum 200 includes a duct wall 212 that is formed about the axial direction X (e.g., when mounted through wall channel 152). Duct wall 212 may be formed according to any suitable hollow shape, such as conduit having a rectangular profile (shown), defining an air channel 210 to guide air therethrough. Moreover, duct wall 212 may be formed from any suitable non-permeable material (e.g., steel, aluminum, or a suitable polymer) for directing or guiding air therethrough. In certain embodiments, plenum 200 further includes an outer flange 220 that extends in a radial direction (e.g., perpendicular to the axial direction X) from duct wall 212. Specifically, outer flange 220 may extend radially outward (e.g., away from at least a portion of the axial direction X or the duct wall 212).

In some embodiments, plenum 200 includes a divider wall 256 within air channel 210. When assembled, divider wall 256 defines a separate upper passage 258 and lower passage 260. For instance, divider wall 256 may extend along the lateral direction L from one lateral side of plenum 200 to the other lateral side. Generally, upper passage 258 and lower passage 260 may divide or define two discrete air flow paths for air channel 210. When assembled, upper passage 258 and lower passage 260 may be fluidly isolated by divider wall 256 (e.g., such that air is prevented from passing directly between passages 258 and 260 through divider wall 256, or another portion of plenum 200). Upper passage 258 may be positioned upstream from outdoor inlet 128. Lower passage 260 may be positioned downstream from outdoor outlet 130.

Figure 3:
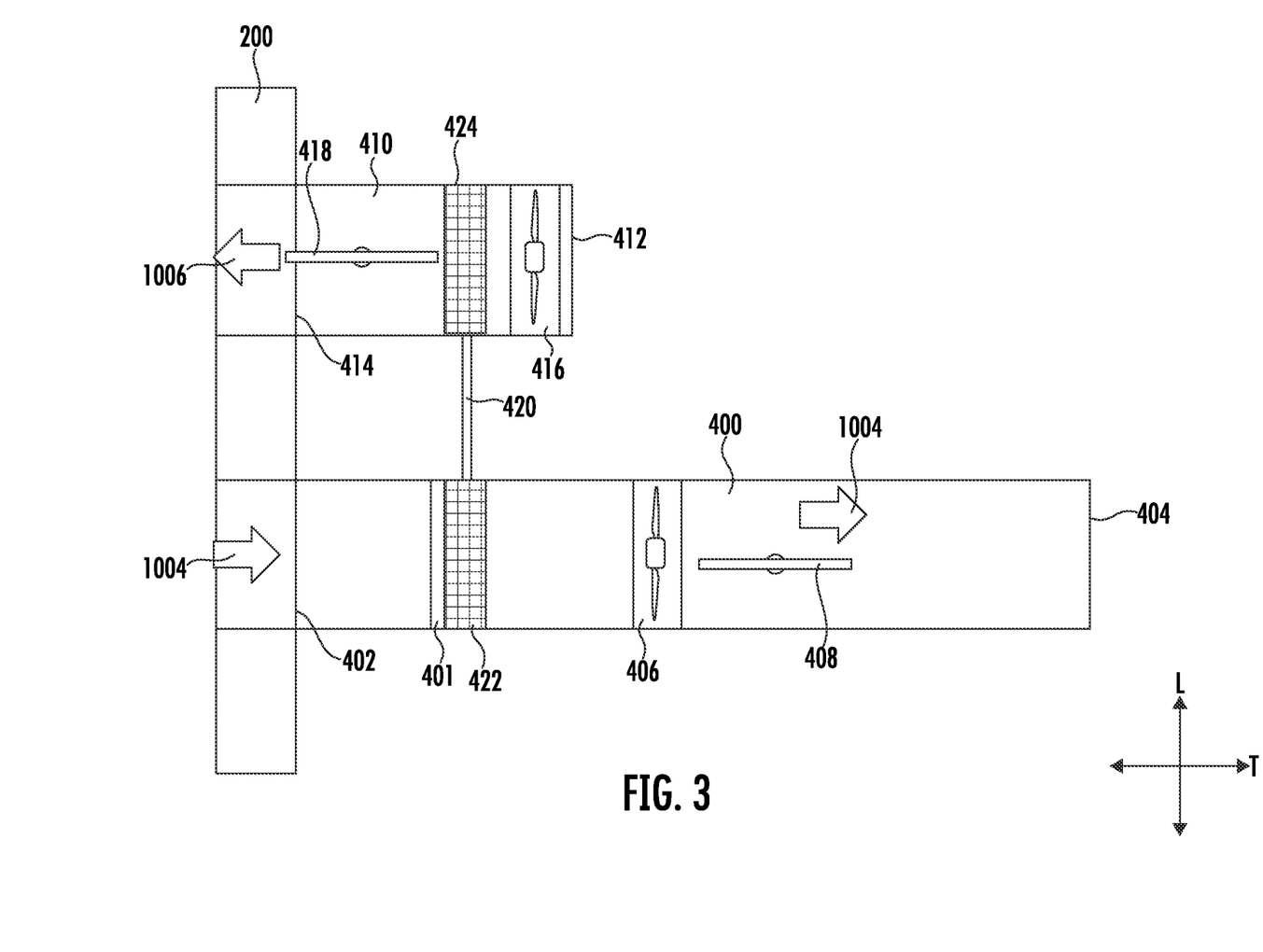
FIG. 3 provides a schematic diagram of a makeup air system with parallel flow energy recovery features according to one or more exemplary embodiments of the present disclosure, which may be incorporated into an air conditioner unit such as the air conditioner unit of FIG. 1.

The plenum 200 may further include a second divider wall 257 which separates a makeup air passage 262 from the remainder of the air channel 210, such as from the upper passage 258 and the lower passage 260. For example, the makeup air passage 262 may be positioned directly above the upper passage 258, whereby the second divider separates and partially defines the makeup air passage 262 and the upper passage 258, e.g., as in the exemplary embodiment illustrated in FIG. 2. Similar to the divider wall 256 described above, the second divider wall 257 may extend along the lateral direction L from one lateral side of plenum 200 to the other lateral side. The makeup air passage 262 may thereby define a discrete air flow path within air channel 210 which is separate and distinct from the upper and lower passages 258 and 260. When assembled, the makeup air passage 262 may be fluidly isolated by the second divider wall 257 from one or both of the upper passage 258 and lower passage 260, e.g., such that air is prevented from passing directly between the makeup air passage 262 and the upper and lower passages 258 and 260 through the second divider wall 257 (or any other portion of plenum 200). The makeup air passage 262 may be positioned upstream from a makeup air intake duct 400. The makeup air intake duct 400 may be disposed above, e.g., on top of, the housing 114. In some embodiments, outdoor air 1000 may optionally be drawn into the makeup air intake duct 400 by a makeup air fan, e.g., a variable speed fan such as muffin fan 406 (see, e.g., FIG. 3), via the makeup air passage 262. In other embodiments, the makeup air system may omit the makeup air intake fan 406, whereby outdoor air 1000 may be drawn into the makeup air intake duct 400 due to reduced pressure or negative pressure within the conditioned space, e.g., room, and/or in the indoor portion 112 of the air conditioner 100. The outdoor air 1000 drawn into the makeup air duct 400 thereby forms a flow of intake air 1004 (FIG. 3). The makeup air intake duct 400 may extend from a first end 402 at the makeup air passage 262 of the plenum 200 to a second end 404 at the indoor portion 112 of the housing 114, e.g., upstream of the indoor inlet 138, whereby outdoor air, e.g., makeup air, may be provided directly to the indoor portion 112 of the air conditioner 100 (and from the indoor portion 112 to the conditioned space) via the makeup air intake duct 400. A makeup air exhaust duct 410 may be positioned upstream of the makeup air passage 262. The makeup air exhaust duct 410 may be disposed above, e.g., on top of, the housing 114 and parallel to the makeup air intake duct 400. Exhaust air 1006 (FIG. 3) flows to the outdoors via the makeup air passage 262 of the plenum 200 from the makeup air exhaust duct 410. A heat exchanger 420 (See, e.g., FIGS. 1 and 4) may be positioned partially in the makeup air intake duct 400 and partially the makeup air exhaust duct 410, and may extend between the makeup air intake duct 400 and the makeup air exhaust duct 410, whereby the heat exchanger 420 transfers thermal energy between the makeup air intake duct 400 and the makeup air exhaust duct 410, e.g., between the discrete air flows therein. Thus, the makeup air intake duct 400 and the makeup air exhaust duct 410 may be components of a makeup air system or makeup air assembly, which will be described in more detail below, and the heat exchanger 420 may be an energy recovery feature and/or may provide energy recovery in the makeup air system, also as will be described in more detail below. Further, certain details of the heat exchanger 420 are omitted in FIG. 1 due to the scale of and number of parts included in FIG. 1, whereas the exemplary heat exchanger 420 is more fully illustrated in FIG. 4.

The operation of air conditioner 100 including compressor 126 (and thus the sealed system generally), indoor fan 142, outdoor fan 124, and other suitable components may be controlled by a control board or controller 158. Controller 158 may be in communication (via for example a suitable wired or wireless connection) to such components of the air conditioner 100. By way of example, the controller 158 may include a memory and one or more processing devices such as microprocessors, CPUs or the like, such as general or special purpose microprocessors operable to execute programming instructions or micro-control code associated with operation of air conditioner 100. The memory may be a separate component from the processor or may be included onboard within the processor. The memory may represent random access memory such as DRAM, or read only memory such as ROM or FLASH.

Air conditioner 100 may additionally include a control panel 160 (FIG. 1) and one or more user inputs 162, which may be included in control panel 160. The user inputs 162 may be in communication with the controller 158. A user of the air conditioner 100 may interact with the user inputs 162 to operate the air conditioner 100, and user commands may be transmitted between the user inputs 162 and controller 158 to facilitate operation of the air conditioner 100 based on such user commands. A display (not shown) may additionally be provided in the control panel 160, and may be in communication with the controller 158. The display may, for example, be a touchscreen or other text-readable display screen, or alternatively may simply be a light that can be activated and deactivated as required to provide an indication of, for example, an event or setting for the air conditioner 100.

Also as may be seen in FIG. 2, in some instances when the plenum 200 is installed within the wall 150 above the floor 151, the remainder of the air conditioner unit 100 may be suspended or cantilevered from the plenum 200. In order to avoid such cantilever, one or more support legs 307 and/or 308 may be provided between the drain pan 300 and the floor 151, whereby at least some of the weight of the remaining components of the air conditioner unit 100 is shifted off of the plenum 200. Where the installation height of the plenum 200 above the floor 151 varies, the required height of the leg(s) 307 and/or 308 will also vary. Thus, the leg(s) 307 and/or 308 may be cut in the field and custom-fitted to the specific installation.

The drain pan 300 may include one or more sockets which are configured to receive the leg(s) 307 and/or 308. For example, as illustrated in FIG. 2, the drain pan 300 may include a first socket 301 and a second socket 302. As illustrated in FIG. 2, the socket(s) 301 and/or 302 may be positioned opposite the plenum 200 along the transverse direction T. For example, the plenum 200 may be positioned at a first transverse end of the drain pan 300 and the socket(s) 301/302 may be positioned opposite the plenum 200 at or near a second transverse end of the drain pan 300. Also as may be seen in FIG. 2, in some embodiments the drain pan 300 may also or instead include one or more of the sockets 301 and/or 302 at the other end of the pan 300, e.g., proximate the plenum 200. In various embodiments, one or both of the sockets 301 and 302 may be provided. In some embodiments, each socket 301 and 302 may be one of a pair of matching shaped sockets which are spaced apart along the lateral direction L and aligned along the transverse direction T.

The material for the leg(s) 307 and/or 308 may be any suitable material which is strong enough to bear the weight of the housing 114 and drain pan 300. For example, materials which are likely to be readily available during installation of the air conditioner unit and which can be suitable for forming the leg(s) 307 and/or 308 include building materials such as lumber, e.g., dimensional lumber such as a nominal two-inch-by-four-inch board, commonly referred to as a two-by-four, or plumbing, e.g., PVC piping having sufficient size (e.g., outer diameter, wall thickness, etc.). Thus, in some embodiments, the socket, e.g., first socket 301, may have a rectangular cross-section and may thereby be configured to receive a leg 307 made of lumber, such as a two-by-four leg, a two-by-six leg, or a four-by-four leg, etc. Additionally, in some embodiments, the socket, e.g., the second socket 302, may be cylindrical and may thereby be configured to receive a round, e.g., cylindrical, leg 308, such as a piece of piping, e.g., a PVC pipe as mentioned above, or, as another example, a steel pipe or other tubular or solid round leg 308.

As mentioned above, the air conditioner 100 may include a makeup air assembly. A schematic diagram of the makeup air assembly according to one or more exemplary embodiments of the present disclosure is provided in FIG. 3. As illustrated in FIG. 3, the makeup air assembly may include energy recovery features, such as parallel flow energy recovery features. As may be seen in FIG. 3 and as will be explained in more detail below, the makeup air assembly may include the makeup air intake duct 400 and the makeup air exhaust duct 410 that is parallel to the makeup air intake duct 400. Thus, the parallel flow may be or include intake air 1004 flowing through the makeup air intake duct 400 in a direction that is parallel to exhaust air 1006 flowing through the makeup air exhaust duct 410. Energy recovery from the parallel flows may be provided by a heat exchanger 420 which includes a first coil 422 in the makeup air intake duct 400 and second coil 424 in the makeup air exhaust duct 410. For example, the makeup air assembly may provide energy recovery, e.g., transfer of heat energy from the intake air 1004 to the exhaust air 1006, via the heat exchanger 420.

As illustrated in FIG. 3, the intake air 1004 may enter through the plenum 200 at and through the makeup air intake duct 400, such as at an intake inlet at the first end 402 of the makeup air intake duct 400. In some embodiments, the intake air 1004 may be drawn into the makeup air intake duct 400 as a result of reduced pressure within the indoor portion 112 of the air conditioner 100, e.g., without the use of a fan in the makeup air system. In other embodiments, a makeup air intake fan 406 may be provided in the makeup air intake duct 400. For example, as illustrated in FIG. 3, the makeup air intake fan 406 may be positioned in the makeup air intake duct 400 downstream of the heat exchanger 420, e.g., downstream of the first coil 422 of the heat exchanger 420, and upstream of a makeup air intake damper 408. A dust filter 401 may also be provided, e.g., upstream of the first coil 422 of the heat exchanger 420.

Exhaust air 1006 may flow from the ambient environment immediately around the air conditioner unit 100 into the makeup air exhaust duct 410 at an inlet end 412 of the makeup air exhaust duct 410. For example, the ambient environment immediately around the air conditioner unit 100 may be a plenum space or an interior of a closet or utility room. Accordingly, the makeup air exhaust duct 410 may be in direct fluid communication with the ambient environment immediately around the air conditioner unit 100. The exhaust air 1006 may flow through the makeup air exhaust duct 410 from the inlet end 412 to an outlet end 414 of the makeup air exhaust duct 410. The outlet end 414 of the makeup air exhaust duct 410 may be coupled to the plenum 200, such as to the makeup air passage 262 thereof. In some embodiments, the makeup air system may include a makeup air exhaust fan 416, which may be a variable speed fan, positioned in the makeup air exhaust duct 410, such as upstream of the second coil 424 of the heat exchanger 420 and of an exhaust damper 418 within the makeup air exhaust duct 410.

Figure 4:
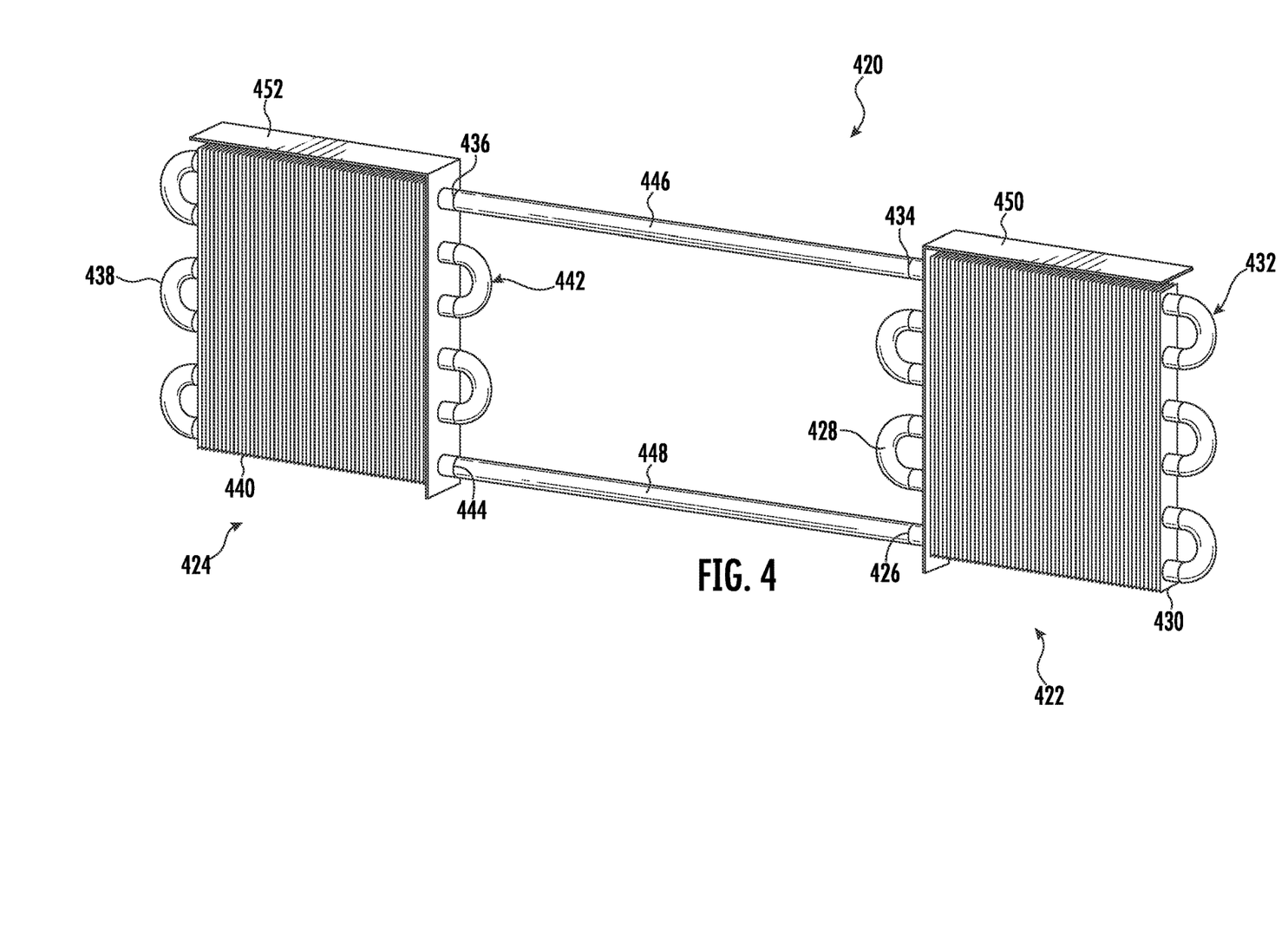
FIG. 4 provides a perspective view of a heat exchanger which may be incorporated into a makeup air system such as the makeup air system of FIG. 3.

FIG. 4 provides a perspective view of the heat exchanger 420 according to one or more embodiments of the present disclosure. As illustrated in FIG. 4, the heat exchanger 420 may include the first coil 422 and the second coil 424. In some embodiments, the first coil 422 may include a first inlet 426, a first tube 428, a first plurality of fins 430 formed on an external surface 432 of the first tube 428, and a first outlet 434. In some embodiments, the second coil 424 may include a second inlet 436, a second tube 438, a second plurality of fins 440 formed on an external surface 442 of the second tube 438, and a second outlet 444. The heat exchanger 420 may further include a first pipe 446 connecting the first outlet 434 and the second inlet 436 and a second pipe 448 connecting the second outlet 444 and the first inlet 426.

In some embodiments, the heat exchanger 420 may also include a bracket 450, 452 on or around each coil 422, 424. For example, the ducts 400 and 410 may each have a slot formed therein (not shown) into and through which each respective coil 422 and 424 extends when the heat exchanger 420 is installed in the makeup air system. The first bracket 450 on the first coil 422 may mate with and enclose the slot (not shown) in the makeup air intake duct 400, whereby the makeup air intake duct 400 is sealed and enclosed at and around the first coil 422 when the makeup air system is assembled. Similarly, the second bracket 452 on the second coil 424 may mate with and enclose the slot (not shown) in the makeup air exhaust duct 410, whereby the makeup air exhaust duct 410 is sealed and enclosed at and around the second coil 424 when the makeup air system is assembled. In some embodiments, the slot in each duct 400, 410 may extend across two sides of the respective duct. In such embodiments, the brackets 450 and 452 may each be L-shaped brackets, e.g., as illustrated in FIG. 4.

The incoming intake air 1004 may be warmer (e.g., have a higher temperature and/or greater thermal energy) than the interior air or indoor air in the conditioned space, such as when the air conditioner unit 100 is operating in a refrigeration mode or cycle. Accordingly, the exhaust air 1006 flowing to the outside may be cooler than the intake air 1004. Thus, the heat exchanger 420 may be operable to recover some of the energy that was used to chill the exhaust air 1006 by transferring thermal energy from the intake air 1004 to the exhaust air 1006.

The intake air 1004 may flow through the heat exchanger 420, such as across, around and through the first coil 422 thereof, e.g. between and around fins 430 and first tube 428 of the first coil 422. The heat exchanger 420 may include a working fluid, e.g., a refrigerant, therein, such as sealed within the heat exchanger 420. The working fluid may be in a liquid state in the first coil 422 and may absorb heat from the intake air 1004 as the intake air 1004 flows through the first coil 422, thereby undergoing a phase change from liquid to vapor state, e.g., in at least some embodiments and/or operations, the first coil 422 is an evaporator coil. The vaporized working fluid may then flow upward through the first tube 428 until the vaporized working fluid reaches the first outlet 434 of the first coil 422, whereupon the vaporized working fluid travels through the first pipe 446 to the second inlet 436.

The exhaust air 1006 may flow through the heat exchanger 420, such as across, around and through the second coil 424 thereof, e.g. between and around fins 440 and second tube 438 of the second coil 424. The vaporized working fluid in the second coil 424 may release heat to the exhaust air 1006 as the exhaust air 1006 flows through the second coil 424, and in so doing, the working fluid may again undergo a phase change from vapor to a liquid state, e.g., in at least some embodiments and/or operations, the second coil 424 is a condenser coil. The liquid working fluid may then flow, e.g., by gravity, downward through the second tube 438 until the liquid working fluid reaches the second outlet 444 of the second coil 424, whereupon the liquid working fluid returns to the first coil 422 through the second pipe 448 to the first inlet 426.

Accordingly, it will be recognized and understood that thermal energy may be transferred from the intake air 1004 to the exhaust air 1006 via the working fluid flowing through the heat exchanger 420, as described above. Therefore, where the interior air, e.g., exhaust air 1006, has been treated, e.g., chilled, by the air conditioner unit 100, at least some of the energy expended to chill the interior air may be recovered via the heat exchanger 420 before the exhaust air 1006 exits the system and used to treat, e.g., chill, the intake air 1004.

In some embodiments, the heat exchanger 420 may be a heat pipe heat exchanger. For example, in such embodiments the heat exchanger 420 may comprise a single, continuous tube or pipe which contains the working fluid sealed therein, and the first coil 422 may be or include a first portion of the single pipe and the second coil 424 may be or include a second portion of the single pipe. In some exemplary embodiments, the first tube 428, the second tube 438, the first pipe 446, and the second pipe 448 may be integrally formed of a single piece of pipe. In some exemplary embodiments, integrally forming may include, for example, welding multiple pipe segments together into a unitary whole with no fasteners or couplings. Such heat pipe embodiments of the heat exchanger 420 may provide an advantageously simple construction, such as without including a valve, expansion device, or pump/compressor in the heat exchanger 420.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioner unit defining a mutually-perpendicular vertical direction, lateral direction, and transverse direction, the air conditioner unit comprising:
   a housing defining an outdoor portion and an indoor portion;
   an outdoor heat exchanger assembly disposed in the outdoor portion and comprising an outdoor heat exchanger and an outdoor fan;
   an indoor heat exchanger assembly disposed in the indoor portion and comprising an indoor heat exchanger and an indoor fan;
   a compressor in fluid communication with the outdoor heat exchanger and the indoor heat exchanger to circulate a refrigerant between the outdoor heat exchanger and the indoor heat exchanger;
   a makeup air intake duct disposed above the housing;
   a makeup air exhaust duct disposed above the housing and parallel to the makeup air intake duct; and
   a heat exchanger comprising:
      a first coil comprising a first inlet, a first tube, a first plurality of fins formed on an external surface of the first tube, and a first outlet, the first coil disposed within the makeup air intake duct;
      a second coil comprising a second inlet, a second tube, a second plurality of fins formed on an external surface of the second tube, and a second outlet, the second coil disposed within the makeup air exhaust duct;
      a first pipe connecting the first outlet and the second inlet; and
      a second pipe connecting the second outlet and the first inlet.

2. The air conditioner unit of claim 1, further comprising an exhaust damper within the makeup air exhaust duct.

3. The air conditioner unit of claim 2, further comprising a variable speed exhaust fan within the makeup air exhaust duct and upstream of the exhaust damper.

4. The air conditioner unit of claim 1, further comprising a variable speed intake fan within the makeup air intake duct.

5. The air conditioner unit of claim 4, further comprising an intake damper within the makeup air intake duct and downstream of the variable speed intake fan.

6. The air conditioner unit of claim 1, wherein the makeup air intake duct extends from a makeup air passage of a plenum to the indoor portion of the housing.

7. The air conditioner unit of claim 1, wherein the makeup air exhaust duct extends from an ambient environment immediately around the air conditioner unit to a makeup air passage of a plenum.

8. The air conditioner unit of claim 1, wherein the heat exchanger is a heat pipe heat exchanger, wherein the first tube, the second tube, the first pipe, and the second pipe are integrally formed of a single piece of pipe, wherein the single piece of pipe is sealed and contains a working fluid therein, whereby the first coil defines an evaporator section of the heat pipe heat exchanger and the second coil defines a condenser section of the heat pipe heat exchanger.

9. The air conditioner unit of claim 8, further comprising a variable speed exhaust fan within the makeup air exhaust duct and upstream of the second coil.

10. The air conditioner unit of claim 8, further comprising a variable speed intake fan within the makeup air intake duct and downstream of the first coil.

11. An air conditioner unit, comprising:
- a housing defining an outdoor portion and an indoor portion;
- an outdoor heat exchanger assembly disposed in the outdoor portion and comprising an outdoor heat exchanger and an outdoor fan;
- an indoor heat exchanger assembly disposed in the indoor portion and comprising an indoor heat exchanger and an indoor fan;
- a compressor in fluid communication with the outdoor heat exchanger and the indoor heat exchanger to circulate a refrigerant between the outdoor heat exchanger and the indoor heat exchanger;
- a makeup air intake duct disposed above the housing;
- a makeup air exhaust duct disposed above the housing and parallel to the makeup air intake duct; and
- a heat exchanger comprising:
  - a first coil comprising a first inlet, a first tube, a first plurality of fins formed on an external surface of the first tube, and a first outlet, the first coil disposed within the makeup air intake duct;
  - a second coil comprising a second inlet, a second tube, a second plurality of fins formed on an external surface of the second tube, and a second outlet, the second coil disposed with the makeup air exhaust duct;
  - a first pipe connecting the first outlet and the second inlet; and
  - a second pipe connecting the second outlet and the first inlet.

12. The air conditioner unit of claim 11, further comprising an exhaust damper within the makeup air exhaust duct.

13. The air conditioner unit of claim 12, further comprising a variable speed exhaust fan within the makeup air exhaust duct and upstream of the exhaust damper.

14. The air conditioner unit of claim 11, further comprising a variable speed intake fan within the makeup air intake duct.

15. The air conditioner unit of claim 14, further comprising an intake damper within the makeup air intake duct and downstream of the variable speed intake fan.

16. The air conditioner unit of claim 11, wherein the makeup air intake duct extends from a makeup air passage of a plenum to the indoor portion of the housing.

17. The air conditioner unit of claim 11, wherein the makeup air exhaust duct extends from an ambient environment immediately around the air conditioner unit to a makeup air passage of a plenum.

18. The air conditioner unit of claim 11, wherein the heat exchanger is a heat pipe heat exchanger, wherein the first tube, the second tube, the first pipe, and the second pipe are integrally formed of a single piece of pipe, wherein the single piece of pipe is sealed and contains a working fluid therein, whereby the first coil defines an evaporator section of the heat pipe heat exchanger and the second coil defines a condenser section of the heat pipe heat exchanger.

19. The air conditioner unit of claim 18, further comprising a variable speed exhaust fan within the makeup air exhaust duct and upstream of the second coil.

20. The air conditioner unit of claim 18, further comprising a variable speed intake fan within the makeup air intake duct and downstream of the first coil.

* * * * *